United States Patent
Paniccia et al.

(10) Patent No.: US 12,392,963 B2
(45) Date of Patent: Aug. 19, 2025

(54) STRUCTURES FOR INTEGRATED SILICON PHOTONICS OPTICAL GYROSCOPES

(71) Applicant: Anello Photonics, Inc., Santa Clara, CA (US)

(72) Inventors: Mario Paniccia, Santa Clara, CA (US); Avi Feshali, Los Angeles, CA (US)

(73) Assignee: Anello Photonics, Inc, Santa Clara, CA (US)

( * ) Notice: Subject to any disclaimer, the term of this patent is extended or adjusted under 35 U.S.C. 154(b) by 0 days.

(21) Appl. No.: 18/306,171

(22) Filed: Apr. 24, 2023

(65) Prior Publication Data

US 2023/0266535 A1    Aug. 24, 2023

Related U.S. Application Data

(60) Continuation of application No. 17/473,699, filed on Sep. 13, 2021, now Pat. No. 11,635,569, and a
(Continued)

(51) Int. Cl.
| | |
|---|---|
| G02B 6/136 | (2006.01) |
| G01C 19/04 | (2006.01) |
| G02B 6/12 | (2006.01) |

(52) U.S. Cl.
CPC ............. G02B 6/136 (2013.01); G01C 19/04 (2013.01); *G02B 2006/12035* (2013.01); *G02B 2006/12176* (2013.01); *G02B 2006/12197* (2013.01)

(58) Field of Classification Search
CPC ................................ G02B 6/136; G02C 19/04
See application file for complete search history.

(56) References Cited

U.S. PATENT DOCUMENTS

| | | |
|---|---|---|
| 3,589,794 A | 6/1971 | Marcatili |
| 4,445,780 A | 5/1984 | Burns |

(Continued)

FOREIGN PATENT DOCUMENTS

CN    109186582 A    1/2019

OTHER PUBLICATIONS

PCT International Search Report and Written Opinion for International Application No. PCT/US2020/036649 mailed Mar. 4, 2021, 29 pages.

(Continued)

*Primary Examiner* — Sung H Pak
(74) *Attorney, Agent, or Firm* — Lowenstein Sandler LLP; Madhumita Datta

(57) ABSTRACT

Disclosed herein are configurations and methods to produce very low loss waveguide structures, which can be single-layer or multi-layer. These waveguide structures can be used as a sensing component of a small-footprint integrated optical gyroscope. By using pure fused silica substrates as both top and bottom cladding around a SiN waveguide core, the propagation loss can be well below 0.1 db/meter. Low-loss waveguide-based gyro coils may be patterned in the shape of a spiral (circular or rectangular or any other shape), that may be distributed among one or more of vertical planes to increase the length of the optical path while avoiding the increased loss caused by intersecting waveguides in the state-of-the-art designs. Low-loss adiabatic tapers may be used for a coil formed in a single layer where an output waveguide crosses the turns of the spiraling coil.

16 Claims, 8 Drawing Sheets

Related U.S. Application Data continuation of application No. 17/179,235, filed on Feb. 18, 2021, now Pat. No. 11,119,276, and a division of application No. 16/894,120, filed on Jun. 5, 2020, now Pat. No. 10,969,548.

(60) Provisional application No. 62/986,379, filed on Mar. 6, 2020, provisional application No. 62/896,365, filed on Sep. 5, 2019, provisional application No. 62/858,588, filed on Jun. 7, 2019.

(56) References Cited

U.S. PATENT DOCUMENTS

| | | |
|---|---|---|
| 7,379,633 B1 | 5/2008 | Ashley et al. |
| 8,761,552 B1 | 6/2014 | Hochberg et al. |
| 2015/0226918 A1 | 8/2015 | Bauters et al. |
| 2016/0170139 A1* | 6/2016 | Absil .............. G02B 6/12 438/31 |
| 2018/0081112 A1 | 3/2018 | Puckett et al. |
| 2018/0081115 A1 | 3/2018 | Puckett et al. |
| 2019/0101392 A1 | 4/2019 | Bischel et al. |
| 2020/0003561 A1 | 1/2020 | Kang |
| 2020/0041270 A1 | 2/2020 | White et al. |
| 2020/0386944 A1 | 12/2020 | Paniccia et al. |
| 2021/0010811 A1 | 1/2021 | Paniccia et al. |

OTHER PUBLICATIONS

Bauters et al., "Planar waveguides with less than 0.1 dB/m propagation loss fabricated with 18, 21 wafer bonding." Optics express 19.24, pp. 24090-2410, Nov. 21, 2011 (Nov. 21, 2011) entire document, especially: p. 24091, para 4; p. 24092, para 2, 3 DO1:<https://doi.org/10.1364/OE.19.024090>[online]<https://www.osapublishing.org/OE/fulltext.cfm? uri=oe-19-24-24090&id=224301 >.

Daryl T. Spencer, et al. "Integrated waveguide coupled Si3N4 resonators in the ultrahigh-Q regime", Optica, vol. 1, No. 3, Sep. 2014, pp. 153-157.

Sarat Gundavarapu et al. "Interferometric Optical Gyroscope Based on an Integrated Si3N4 Low-Loss Waveguide Coil", Journal of Lightwave Technoloy, vol. 36, No. 4, Feb. 15, 2018, pp. 1185-1191.

Demis D. John et al. "Multilayer Platform for Ultra-Low-Loss Waveguide Applications" IEEE Photonics Technology Letters, vol. 24, No. 11, Jun. 1, 2012, pp. 876-878.

Daryl T. Spencer et al. "Integrated single and multi-layer Si3N4 platform for ultralow loss propagation and small bending radii", OSA 2014, 3 pages.

Sudharsanan Srinivasan et al. "Design of integrated hybrid silicon waveguide optical gyroscope", OSA, 2014, 6 pages.

* cited by examiner

STRUCTURES FOR INTEGRATED SILICON PHOTONICS OPTICAL GYROSCOPES

RELATED APPLICATIONS

This application is a continuation of co-pending U.S. patent application Ser. No. 17/473,699, filed Sep. 13, 2021, titled "Structures for Integrated Silicon Photonics Optical Gyroscopes With Structural Modifications At Waveguide Crossing", which is a continuation and claims the benefit of U.S. patent application Ser. No. 17/179,235, filed Feb. 18, 2021, now U.S. Pat. No. 11,119,276, issued Sep. 14, 2021, titled "Single-Layer and Multi-Layer Structures For Integrated Silicon Photonics Optical Gyroscopes", which is a divisional of and claims the benefit of U.S. patent application Ser. No. 16/894,120, filed Jun. 5, 2020, now U.S. Pat. No. 10,969,548, issued Apr. 6, 2021, titled "Single-Layer and Multi-Layer Structures for Integrated Silicon Photonics Optical Gyroscopes," which claims the benefit of U.S. Provisional Patent Application Nos. 62/986,379, filed Mar. 6, 2020, titled "Process Flow for Fabricating Integrated Photonics Optical Gyroscopes," and 62/896,365, filed Sep. 5, 2019, titled, "Single-Layer and Multi-Layer Structures for Integrated Silicon Photonics Optical Gyroscopes," and 62/858,588, filed Jun. 7, 2019, titled "Integrated Silicon Photonics Optical Gyroscope On Fused Silica Platform," the entireties of which are incorporated herein by reference.

TECHNICAL FIELD

The present disclosure relates generally to low-loss optical waveguide structures, and specifically to use of the waveguide structures for integrated photonics-based optical gyroscopes.

BACKGROUND

Gyroscopes (also referred to in short as "gyros") are devices that can sense angular velocity. The applications of gyroscopes include, but are not limited to, military, aircraft navigation, robotics, autonomous vehicles, virtual reality, augmented reality, gaming etc. Gyroscopes can be mechanical or optical, and can vary in precision, performance, cost and size. Since optical gyroscopes do not have any moving parts, they have advantages over mechanical gyroscopes as they can withstand effects of shock, vibration and temperature variation better than the mechanical gyroscopes with moving parts. The most common optical gyroscope is the fiber optical gyroscope (FOG) that operates based on interferometric measurements of optical phase shift due to the Sagnac effect (a phenomenon encountered in interferometry that is elicited by rotation). Construction of a FOG typically involves a coil comprising several turns of polarization-maintaining (PM) fiber. Laser light is launched into both ends of the PM fiber coil so that two optical beams travel in opposite directions. If the fiber coil is moving, the optical beams traveling in opposite directions experience different optical path lengths with respect to each other. By setting up an interferometric system, one can measure the small path length difference that is proportional to the area of the loop enclosed by the turns of the fiber coil and the angular velocity of the rotating fiber coil. This path length difference is expressed as a phase signal.

Phase signal of an optical gyro is proportional to the Sagnac effect times the angular rotation velocity, as shown in the following equation:

$$\Delta\phi = (8\pi NA/\lambda c)\Omega$$

where,
N=number of turns in the gyro,
A=area enclosed
$\Omega$=angular rotation velocity
$\Delta\phi$=optical phase difference signal
$\lambda$=wavelength of light
c=speed of light Fiber-based gyroscopes can provide very high precision, but at the same time, they are of larger footprint, are very expensive, and are hard to assemble due to the devices being built based on discrete optical components that need to be aligned precisely. Often, manual alignment is involved, which is hard to scale up for volume production.

The key to FOG's performance is the long length of high quality, low loss, optical fiber that is used to measure the Sagnac effect. The present inventors recognize that with the advent of integrated silicon photonics suitable for wafer scale processing, there is an opportunity to replace FOGs with smaller integrated photonic chip solutions without sacrificing performance.

SUMMARY

Present inventors propose using waveguide based integrated photonics components instead of fibers for cost-effective easy integration on a semiconductor platform which is much more promising for volume production of gyroscopes. This application describes various single-layer and multi-layer structures and processes for fabricating silicon nitride (SiN) waveguide cores in a silicon fab, as elaborated below. Note that the word "layer" as used in single-layer and multi-layer in the specification means a section of the waveguide structure with a waveguide core surrounded by corresponding claddings. The term "plane" has been used interchangeably with the term "layer" to convey the same concept of a section with a waveguide core surrounded by corresponding claddings.

Photonics based optical gyros have reduced size, weight, power and cost, but in addition can be mass produced in high volume, are immune to vibration and have the potential to offer performances equivalent to FOGs.

One key element of this integrated photonic solution is to produce very low loss waveguides that can be manufactured using wafer scale processes and can be used to replace the long length PM optical fiber in optical gyros. The technology platform used for this integrated photonics based optical gyros is based on silicon nitride ($Si_3N_4$)—sometimes also referred to as SiN for simplicity.

Disclosed herein are configurations and methods to produce very low loss waveguides that can be used as integral component for a small-footprint integrated optical gyroscope, which is abbreviated as SiPhOG™ (Silicon Photonics Optical Gyroscope), though compound semiconductor (III-V semiconductor) based integrated photonics optical gyroscopes are also within the scope of this disclosure. Furthermore, some embodiments of the integrated photonics optical gyroscopes may have a combination of silicon photonics and III-V semiconductor based photonics components.

An optical gyroscope module has a front-end chip with electrical and optical components for optical signal processing and a waveguide chip coupled to the front-end chip. In the waveguide chip (also referred to as the "gyro chip" or "sensing chip"), low-loss waveguide core may be made of silicon nitride ($Si_3N_4$), and the waveguide cladding may be made of fused silica or oxide. The oxide layer can be grown if the substrate has a crystalline Si structure to support growth of oxide. Alternatively, the oxide layer can be deposited, such as using precursor like Tetraethyline Orthosilicate (TEOS), or other precursors described elsewhere in this specification. For non-crystalline fused silica substrate, deposition is the method of forming an oxide layer. This waveguide structure is also referred to simply as SiN waveguide, and a chip containing the SiN waveguide may be referred to as a SiN waveguide chip in the figures. As will be discussed below, the waveguide structure can be single layer or multi-layer.

By using pure fused silica (non-crystalline glass, which is referred to simply as "glass" at some places in the specification) substrates as both top and bottom cladding of the SiN waveguide, the propagation loss can be well below 0.1 db/meter. The solution involves patterning a low-loss waveguide-based gyro coil (patterned in the shape of a spiral with several turns), that may be distributed among one or more vertical planes to increase the length of the optical path while avoiding the increased loss caused by intersecting waveguides in the state-of-the-art designs. Additionally, the present inventors recognize that instead of a spiral, a simple ring resonator or other geometries may be used as SiPhOG. For Ring Resonator (RR) design the optical signal is coupled into the ring waveguide via a straight waveguide disposed at a coupling distance away from the ring waveguide on the same plane or on a different plane. Note that in the specification and claims, the term "loop" is meant to encompass both a single turn-loop (such as in ring resonator) or a multi-turn loop (such as in a fiber coil).

More specifically, in one aspect, a waveguide structure is disclosed, comprising: a first fused silica wafer with a first etched trench thereon, wherein the first fused silica wafer acts as a first cladding; a first core formed in the first etched trench of the first fused silica wafer, wherein the first core comprises silicon nitride (SiN); and, a second fused silica wafer bonded to the first fused silica wafer, wherein the second fused silica wafer acts as a second cladding, wherein the second cladding is adjacent to the first cladding, and wherein the first cladding and the second cladding collectively completely surround the first core from the top, bottom and sides.

In another aspect, a waveguide structure is disclosure, comprising: a first fused silica wafer with a first etched trench thereon, wherein the first fused silica wafer acts as a first cladding; a first core formed in the first etched trench of the first fused silica wafer, wherein the first core comprises silicon nitride (SiN); an interposing layer that separates two planes of the waveguide structure; a second fused silica wafer with a second trench thereon, wherein the second fused silica wafer acts as a second cladding; and, a second core formed in the second etched trench of the second fused silica wafer, wherein the second core comprises silicon nitride (SiN). The first fused silica wafer with the first core is bonded to a first surface of the interposing layer, and the second fused silica wafer with the second core is bonded to a second surface of the interposing layer, wherein the first surface and the second surface of the interposing layer are opposite to one another.

In yet another aspect, a waveguide structure is disclosed, comprising: a first fused silica wafer acting as a first cladding; a patterned silicon nitride (SiN) layer formed on top of the first fused silica wafer, wherein the patterned SiN layer acts as a first core; an oxide layer coinciding with the patterned SiN layer, wherein the oxide layer surrounds the first core from the sides; and, a second fused silica wafer bonded to the oxide layer and the patterned SiN layer, wherein the second fused silica wafer acts as a second cladding, and wherein the first core is surrounded by the first fused silica wafer on the bottom, and second fused silica wafer on the top and the oxide layer on the sides.

While a focus of this patent application is waveguide fabrication and the fused silica material used above and below the SiN waveguide core, the inventors design the entire photonics optical gyroscope chip (including a front-end chip and the waveguide chip) with higher-level system architecture and key performance parameters in mind, including, but not limited to laser performance, tuning parameters, detector parameters, as well as packaging considerations.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to configurations of compact ultra-low loss integrated photonics-based waveguides for optical gyroscope applications, and the methods of fabricating those waveguides on a fused silica platform for ease of large scale manufacturing. The waveguides have a propagation loss of 0.1 db/m or even lower. The waveguides are part of a SiPhOG chip, which may be part of an inertial measurement unit (IMU) package. Note that IMU may have other components, such as accelerometers, in addition to the SiPhOG chip. Therefore, making the SiPhOG part compact reduces the overall size, weight power and cost of the IMU. This weight reduction can be crucial for certain applications, for example, lightweight unmanned aerial vehicles. IMU may be a needed technology component a for more establishing sensing technologies for autonomous vehicles, such as LiDAR (Light Detection and Ranging), radar and cameras that will be used in future generation of autonomous vehicles.

Figure 1A:
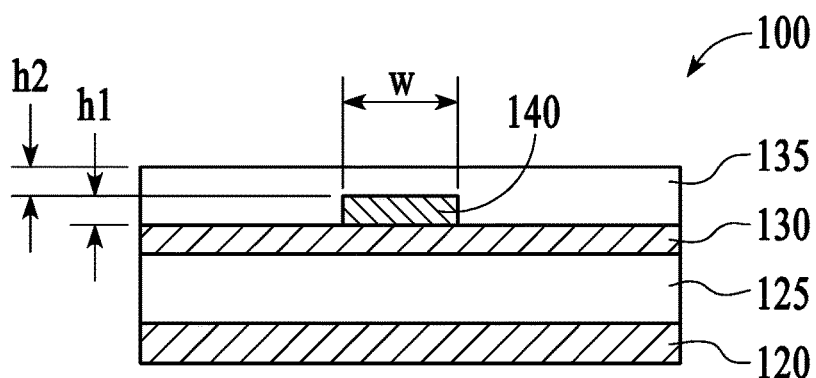
FIG. 1A is a schematic of a SiN waveguide (cross sectional view) on conventional silicon substrate with asymmetric upper cladding (e.g., deposited oxide like TEOS) and lower cladding (e.g., frown oxide), according to embodiments of the present disclosure.

FIG. 1A is a schematic cross-sectional view of a SiN waveguide fabricated on a conventional silicon substrate with asymmetric upper cladding (e.g., TEOS) and lower cladding (grown oxide) around the SiN waveguide. A non-limiting illustrative dimension of the SiN waveguide is a height (i.e. thickness 'h1' of the waveguide layer) of 90 nm and a lateral width (V) of 2.8 µm. Persons skilled in the art would appreciate that these illustrative dimensional values mentioned in the specification are not limiting to the scope of the disclosure. TetraEthyl OrthoSilicate (TEOS) is a commonly used precursor to silicon dioxide in the semiconductor industry. In the embodiment shown in FIG. 1A, the silicon substrate (125) has pre-grown oxide layers (120 and 130) on both sides. An example thickness of the oxide layers is 15 µm. In other embodiments, only the top oxide layer 130 may be grown on the silicon substrate 125. The SiN waveguide core 140 is then formed and photolithographically or otherwise patterned on the oxide layer 130. An oxide layer (135), such as a TEOS layer, is then deposited to cover the SiN waveguide. The deposited oxide layer may initially have a thickness of 3 µm. The hydrogen in the oxide layer needs to be minimized, and the deposition rate is adjusted accordingly. The hydrogen in the deposited TEOS layer is minimized by controlling the deposition parameters, such as pressure, gas sources, temperature, Nitrogen gas in the furnace etc. As an alternative to silane-based precursor for TEOS deposited by Low Pressure Chemical Vapor Deposition (LPCVD), one can also use chlorine-based source ($SiCl_2H_2$) for oxide deposition or deuterated source ($SiD_4$) to further reduce the amount of hydrogen in the deposited oxide layer. These alternative methods reduce the need to drive out hydrogen and other impurities by thermal annealing. Similarly, though SiN can be deposited by LPCVD, an alternative is to deposit SiN using deuterated source SiN:D that reduces N—H bonds and hence reduces absorption near the wavelengths of interest.

The wafers may need to be annealed for a period of time (e.g., the period be 2-10 hours) at elevated temperature (e.g., 1100-1300° C.) to help diffuse out the hydrogen to reduce the loss. Total final thickness of the TEOS (or oxide) layer may be obtained in several rounds, e.g. each round producing a sub-layer that is 0.1 to 0.2 µm thick. Note that the structure 100 shown in FIG. 1A has asymmetric cladding around the waveguide, as the upper cladding is deposited TEOS, and the lower cladding is grown oxide. The waveguide loss depends largely on the quality of the TEOS layer acting as the upper cladding.

Figure 1B:
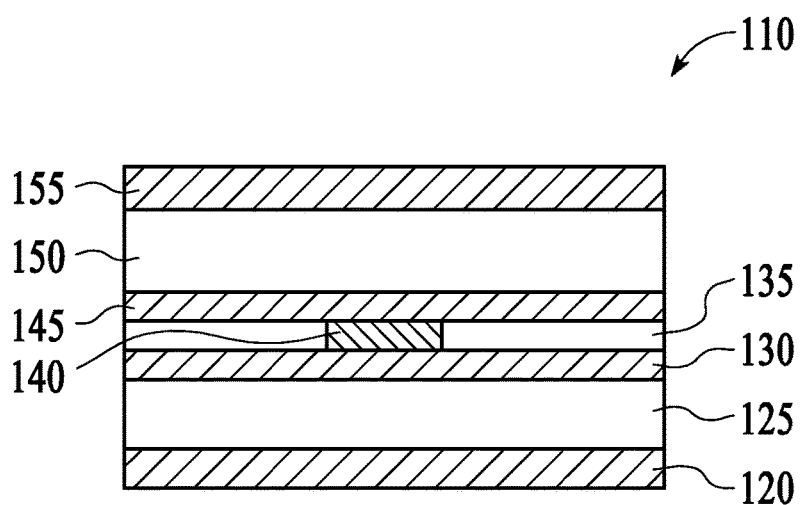
FIG. 1B is schematic of a SiN waveguide (cross sectional view) on silicon substrate, which is bonded to another silicon substrate for a symmetrical upper and lower cladding), according to embodiments of the present disclosure.

FIG. 1B shows an alternative structure 110 where the upper and lower claddings are more symmetric. This structure is obtained via wafer bonding. The initial thickness of the deposited oxide is reduced by 'h2' (by chemical mechanical polishing (CMP) or other means) so that the top of the wafer is substantially planar and flush with the top of the SiN waveguide. Then another wafer with a silicon layer 150 with top and bottom pre-grown oxide layers 155 and 145 is wafer-bonded to the planar top surface of the polished wafer with the SiN waveguide core 140. The thickness of the waveguide SiN core 140 may be 60-90 nm. Note that the loss value in this configuration depends on the quality of CMP in addition to the quality of the deposited oxide and the time and temperature of the anneal.

Figure 2:
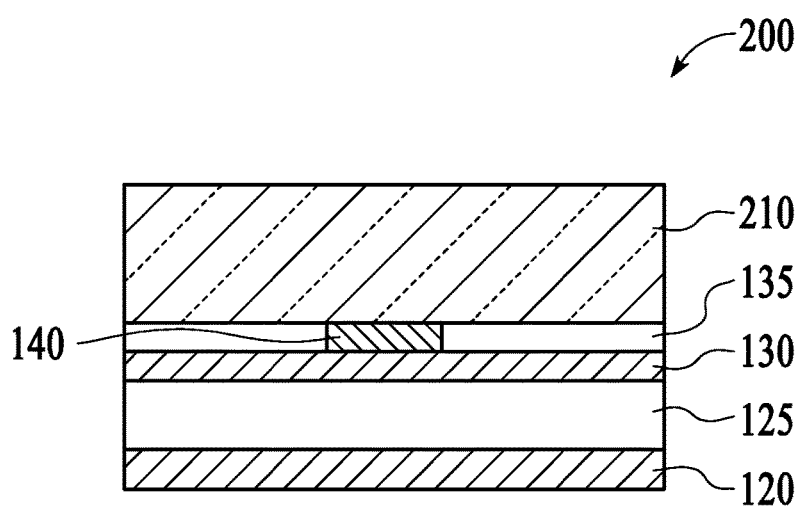
FIG. 2 is a schematic of a SiN waveguide (cross sectional view) which is bonded to a fused silica (glass) substrate acting as the upper cladding), according to embodiments of the present disclosure.

FIG. 2 shows a structure 200 where the upper cladding is a glass wafer (210), substituting the oxide-coated silicon wafer 150 shown in FIG. 1B. The material of the glass wafer may be non-crystalline fused silica instead of silicon with pre-grown oxide. Using IR-pure fused silica insures that it is impurity free and has low absorption in the infra-red (IR) wavelength region (1500-1600 nm).

Figure 3:
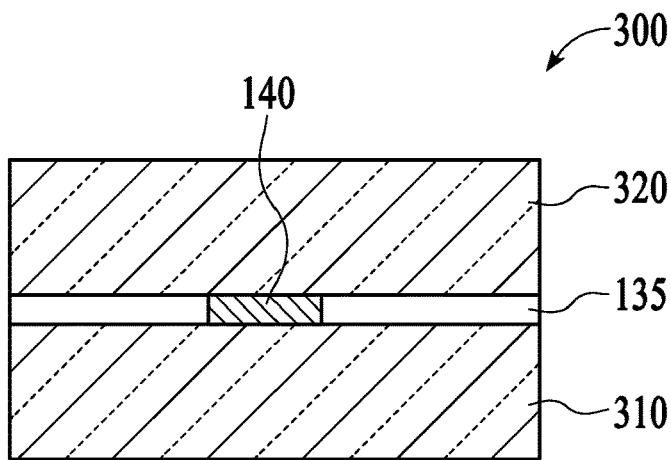
FIG. 3 is a schematic of a SiN waveguide (cross sectional view) on a fused silica substrate which is bonded to another fused silica (glass) substrate for the upper cladding), according to embodiments of the present disclosure.
Figure 4:
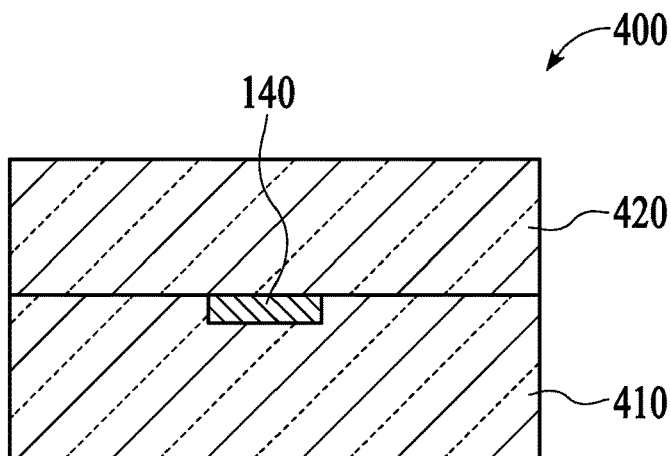
FIG. 4 is schematic of a SiN waveguide (cross sectional view) where a trench is first etched into a fused silica substrate and then the SiN is deposited to fill the trench and then the wafer is polished using chemical mechanical polishing (CMP), according to embodiments of the present disclosure. After CMP, the wafer is bonded to another fused silica (glass) substrate without an intermediate oxide layer. This provides a low loss defect free cladding that is symmetric on both sides of the SiN.

FIG. 3 shows a structure 300 where the upper cladding and lower cladding both may be glass wafers (310 and 320). Though FIG. 3 shows an oxide layer 135 (such as a TEOS layer) in between the glass wafers 310 and 320, the oxide layer 135 may not be needed if the SiN waveguide core 140 is etched into the bottom wafer 310 in an all-glass configuration as shown in FIG. 4. In some embodiment, instead of having the oxide laterally encompassing the core 140, layer 135 may have air gap immediately adjacent to the core 140. For structural support, the oxide layer may coincide with the air gap layer.

FIG. 4 shows an example of fabricating an all-glass configuration 400. The process starts with a glass substrate 410. Then a trench for the SiN waveguide core 140 is etched into the first glass substrate 410, as shown in FIG. 4. Then SiN is deposited to fill the trench and then CMP is performed to planarize the top surface of the wafer 410 with the SiN waveguide core 140 etched into it. Then a second glass wafer 420 may be bonded on top of the wafer 410 having the SiN waveguide core 140. Wafer bonding process can be done at various temperature and pressure based on the integration flow and considerations and the materials involved. For example, a covalent bonding for fused silica wafers is done by activation of the two surfaces that are bonded by oxygen plasma followed by a thermomechanical step that create the final bond. Anodic bonding is also an alternative approach that can be used to bond the two fused silica wafers. Also, bonding can be done between an oxide layer and a fused silica wafer.

Figure 5:
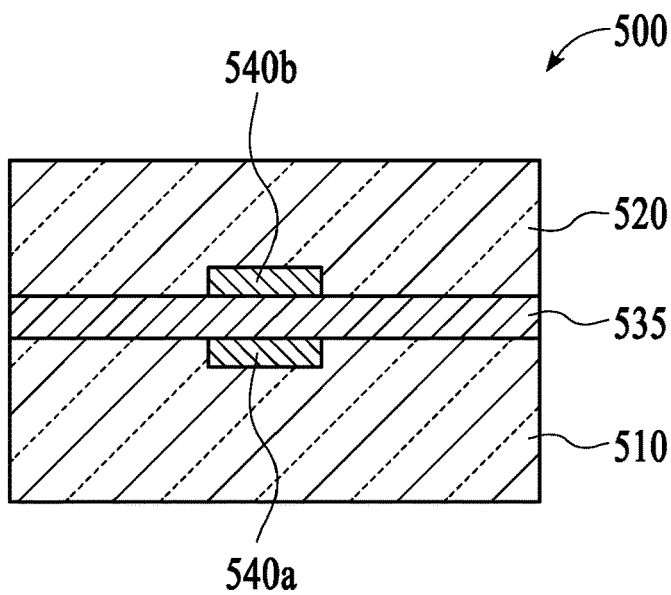
FIG. 5 is schematic of a multi-layer stacked SiN waveguide (cross sectional view) structure, where the waveguides are created (per the process described for the structure in FIG. 4) into two fused silica substrates, which are then bonded together, separated by an additional interposing layer, according to embodiments of the present disclosure. This additional interposing layer could be TEOS, oxide, or could be another fused silica layer.

FIG. 5 illustrates the concept of stacked waveguides in two planes in a structure 500. Waveguide cores 540a and 540b have a finite vertical gap (equal to the thickness of the layer 535) in between them. As will be described later with respect to subsequent figures, the vertical gap facilitates avoiding crossing the waveguides on the same plane (which increases overall loss), while still making optical coupling possible between the layers. A glass wafer may be polished down to 3-5 μm to act as an intermediate layer 535. A glass wafer 510 may have an etched waveguide core 540a. The polished glass wafer with intermediate layer 535 is bonded to the wafer 510. Another glass wafer 520 (similar to wafer 510) with an etched waveguide core 540b may be flipped on top of the intermediate layer 535. The all-fused silica ("all-glass") configuration offers pure symmetric cladding around the waveguide cores and results in the lowest loss. Note that the intermediate layer being glass 535 is just one configuration. In alternative embodiments, the layer 535 may be an oxide layer or made of some other materials.

Persons skilled in the art would appreciate that though FIG. 5 shows only two layers stacked on top of each other, the process can be repeated to add more waveguide layers in the vertical direction. The scope of this disclosure encompasses tuning the process parameters, such as the SiN waveguide thickness, lithography, etch, CMP etc. to ensure the lowest possible loss. For example, using poor quality oxide deposited by chemical vapor deposition (CVD) increases the loss manifold. Additionally, the process can be tuned to control sidewall roughness for the waveguides, as that can increase the overall loss as well. It might be difficult to decouple waveguide propagation loss with loss caused by line edge roughness (LER) or line width roughness (LWR). In general, by conducting rigorous experiment, the inventors have come up with a process involving fused silica substrate, deposited cladding, CMP, wafer bonding (layer transfer), optimized thickness of the SiN waveguide, and high-temperature anneal, whose combined effect is to achieve ultra-low-loss (<0.1 db/m) waveguides.

Figure 6:
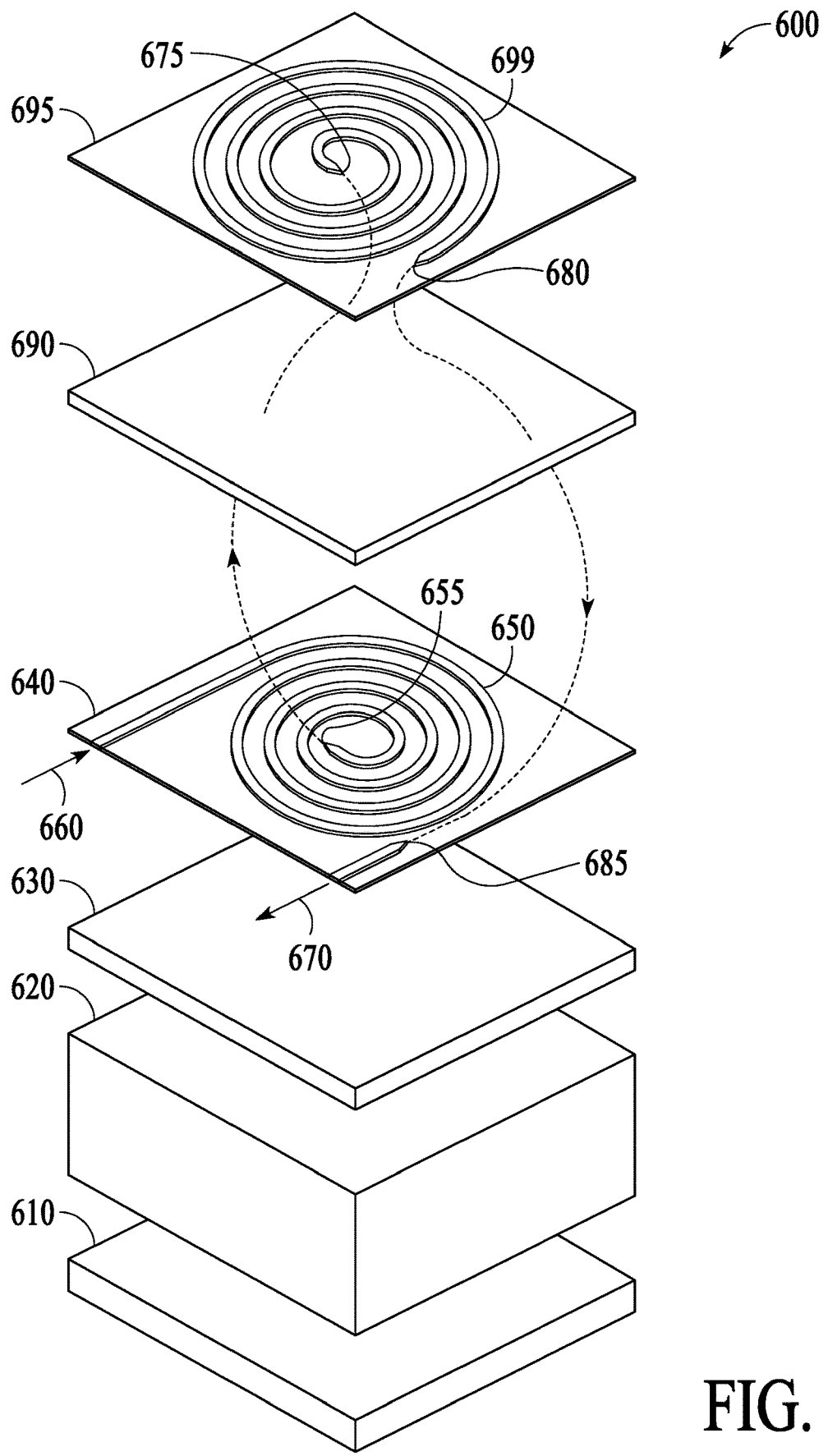
FIG. 6 is an exploded perspective view of a spiral waveguide based SiPhOG), according to embodiments of the present disclosure, where the output waveguide does not intersect with the turns of the gyro coil, according to embodiments of the present disclosure. There are portions of the gyro coil both on the top plane and the bottom plane, and the output waveguide comes out from the same plane as the input waveguide.

FIG. 6 is an exploded perspective view of a spiral waveguide based SiPhOG 600 where the output waveguide does not intersect with the turns of the gyro coil. There are portions of the same gyro coil both on the top plane and the bottom plane, and the output waveguide comes out from the same plane as the input waveguide for efficient coupling. Persons skilled in the art would appreciate that efficient coupling with external components (e.g., lasers, detectors etc.) on the front-end chip may depend on the on the output waveguide and the input waveguide to be on the same plane. Also, by distributing the total length of the coil between two layers (top and bottom), the length of propagation can be increased without increasing the footprint of the gyro coil, but intersection of waveguides can be avoided. Conventional photonic gyros encounter the problem of intersecting waveguides, as the direction of propagation of light has to remain the same within the coil. Intersecting waveguides lead to increased loss, which the design in FIG. 6 with non-intersecting waveguides in two or more layers can avoid.

In FIG. 6, the substrate 620 is fused silica or Si substrate. Layers 610 and 630 may be oxide or fused silica layers. Though the waveguide gyro coil (also referred to as a spiral waveguide) is shown as raised on top of the layer 640, it may be etched into the layer 630 as shown in FIG. 4. The input end of the waveguide gyro coil that receives an optical signal is denoted as 660, wherein the output end is denoted as 670. The waveguide gyro coil has a bottom portion 650 that spirals inwards to the tapered tip 655, where it couples up to the top layer 695 that has the rest of the waveguide gyro coil (top portion 699). Though the waveguide portion 699 is shown as raised above the layer 695, it may be etched into layer 690. Thickness of a layer 690 (typically an oxide layer in between the layers 640 and 695) sets the coupling gap. The top portion 699 of waveguide gyro coil starts from the tapered tip 675, and spirals outwards to the other tapered tip 680, from where light couples down to the tapered tip 685 of the waveguide on the bottom plane to go out via output port 670 (to a detector or other optical system components in the front-end chip). The arrowed dashed lines show the coupling up and coupling down between the tapered tips in the two planes. The taper design and the vertical separation between the two waveguide layers dictate coupling efficiency between the two planes. In order for light to couple between the two vertically separated waveguide layers, the tapered tips 655 and 675 must have some overlap, and the tapered tips 680 and 685 must have some overlap.

Figure 7:
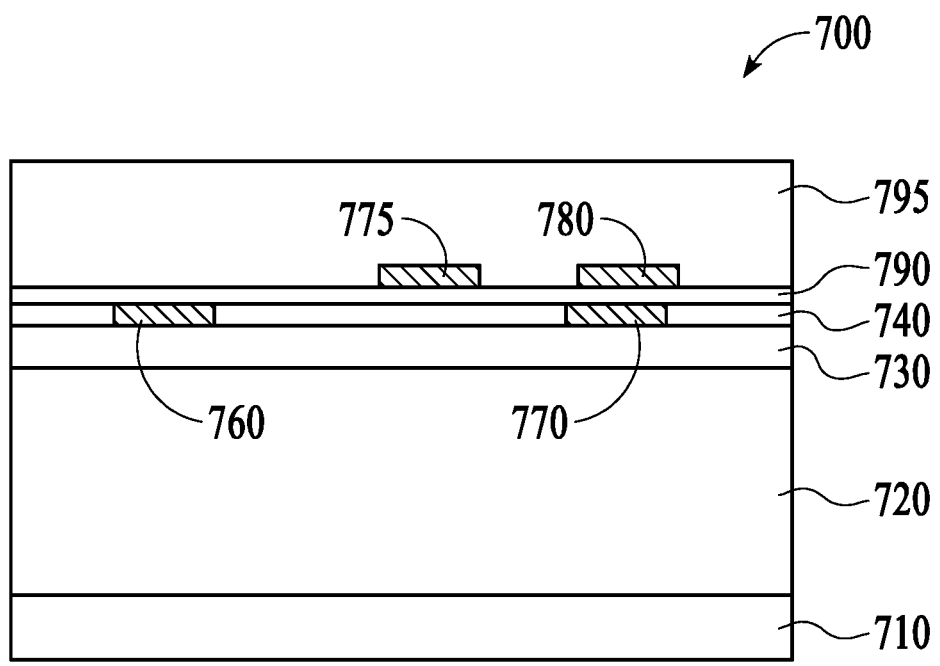
FIG. 7 is a schematic of a spiral waveguide based SiPhOG (cross sectional view) structure, according to embodiments of the present disclosure where waveguides in at least one layer are etched and patterned into a fused silica substrate, which is then bonded together with another layer of waveguide, separated by a vertical coupling distance, both the layers of waveguides forming part of the same gyro coil.

FIG. 7 shows a cross sectional view of a structure 700 where input end 760 and output end 770 of a waveguide gyro coil are shown, but for clarity, cross section of the intermediate turns of the gyro coil are not shown. Light couples up to the upper layer waveguide 775 (at the center of a coil) and then couples down from the upper layer waveguide 780 to the lower layer waveguide to eventually come out from the output end 770. Layers 710, 720, 730, 740 and 790 may be equivalent to layers 610, 620, 630, 640, and 690 shown in FIG. 6. Though not specifically shown in FIG. 6, the upper layer waveguides (e.g., 699) may have a cladding layer, somewhat similar to cladding layer 795 shown in FIG. 7.

It is to be noted that in FIG. 6, the waveguide gyro coil is distributed between two planes. However, with advance wafer bonding techniques described herein, the waveguide gyro coil may be distributed between three or more vertical planes.

Figure 8:
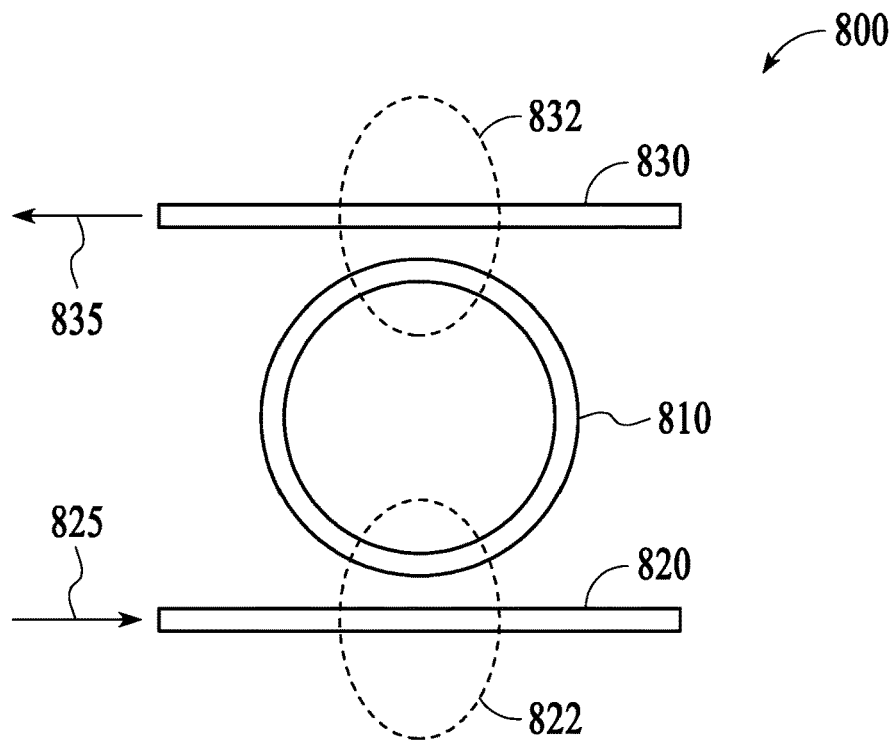
FIG. 8 shows a first version of ring resonator-based SiPhOG structure created in fused silica substrate per FIG. 4, according to embodiments of the present disclosure.
Figure 9:
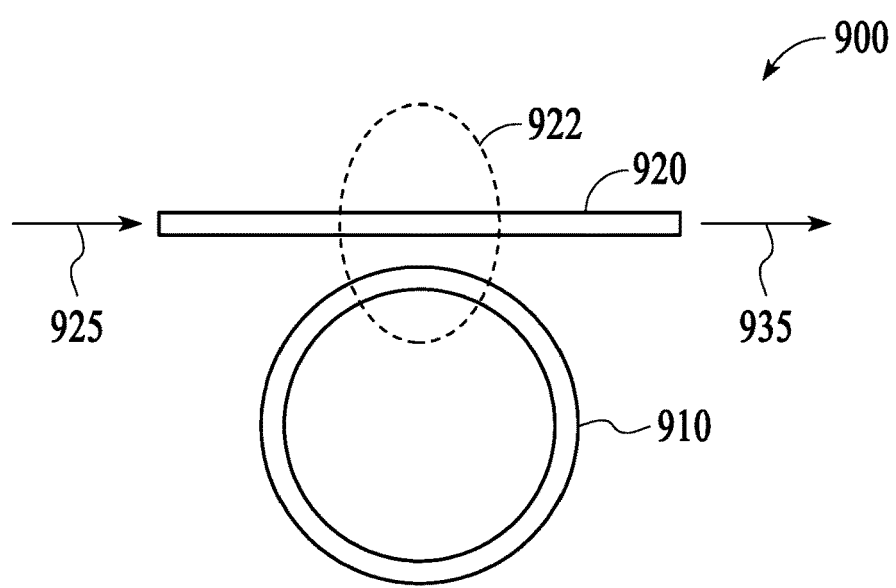
FIG. 9 shows a second version of ring resonator-based SiPhOG structure created in fused silica substrate per FIG. 4, according to embodiments of the present disclosure.
Figure 10:
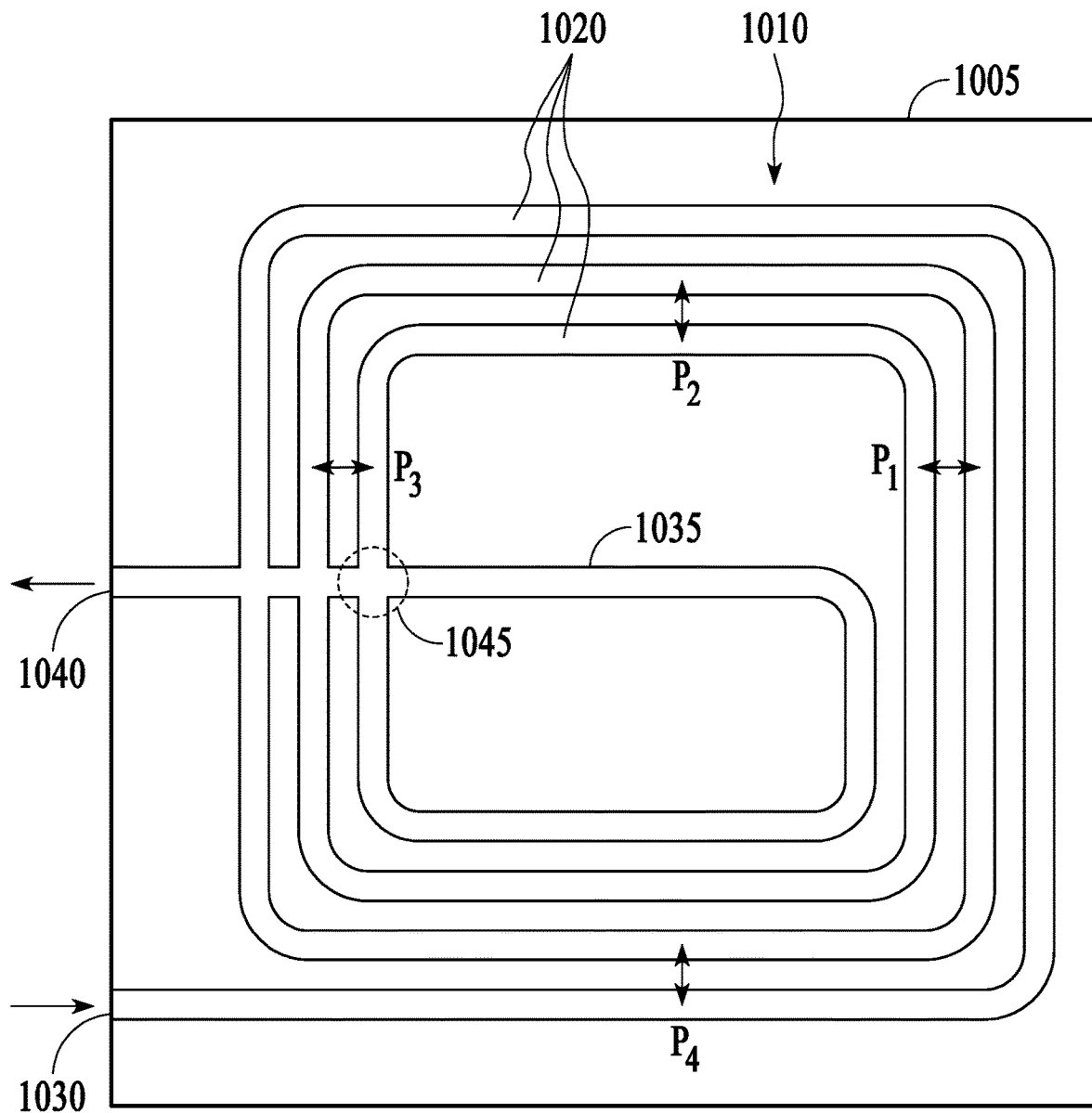
FIG. 10 shows the top view of a rectangular gyro coil in one layer with symmetrical pitch between the waveguides everywhere, according to embodiments of the present disclosure.

FIGS. 8 and 9 show two configuration of an alternative SiPhOG embodiment using ring resonator waveguides instead of waveguide gyro coil shown in FIG. 6. In the configuration 800 shown in FIG. 8, input light signal 825 comes in from the input end of the waveguide 820, couples into the ring 810 within the coupling region 822, propagates within the ring resonator 810, couples back into the output waveguide 830 within the coupling region 832, and comes out as output signal 835 via the output end.

In the configuration 900 shown in FIG. 9, input light signal 925 comes in from the input end of the waveguide 920, couples into the ring 910 within the coupling region 922, propagates within the ring resonator 910, couples back into the output waveguide (same waveguide 920) within the coupling region 922, and comes out as output signal 935 via the output end.

Note that ring resonators may be formed on a single plane where optical coupling happens laterally between the ring and the straight waveguides, as shown in FIGS. 8 and 9.

Alternatively, the ring resonator may be on a plane different than the plane of the input and/or output waveguides, requiring optical coupling in the vertical direction.

Persons skilled in the art will appreciate that different generations of SiPhOGs may be based on interferometric waveguide gyro coils or ring resonators, but both configurations depend on low-loss waveguides and cladding structures as described in FIGS. 1A-5 in this disclosure.

Additionally, the shape of the waveguide-based gyro coil does not have to be a circular spiral. As shown in FIGS. 10-13, a gyro coil may have a rectangular shape (a square being a special kind of rectangle with sides of equal length). Other shapes, such as elliptical or oval shape are also possible. In a mask layout, some portions of the layout may have gyro coil waveguides, and other portions may have ring waveguides or other test structures based on waveguides. In addition one may stitch or print multiple dies (e.g., 2-4 or more dies) together to create one larger die. The gyro coils (rectangular, circular, or oval or any other shape) may have varying number of turns and varying diameters and varying shapes of input/output waveguides. Non-circular (e.g., rectangular) gyro coil designs may provide better utilization of the real-estate on the mask layout that translates to better utilization of the real-estate on the fabricated SiPhOG chip. Note that, in FIGS. 10-13, only a few turns of the coils are shown for clarity, where a gyro coil actually comprises many turns (e.g. hundreds of turns) of closely spaced waveguides of (e.g., 2.5-3 um range width per waveguide). The spacing between adjacent waveguide turns in the coil may be dictated by cross-talk and interference. In summary, the waveguide-based gyros can have varying geometries as long as the expected performance is harnessed from them.

Gyro coils may be fabricated in a single layer or may be distributed in multiple layers. For a single-layer configuration, the output waveguide has to cross the turns of the waveguide gyro coil. For example, in the top view of the embodiment shown in FIG. 10, an optical signal enters the input end 1030 of the waveguide-based gyro coil 1010 on a SiPhOG chip 1005. The optical signal comes out of the output end 1040 of the output waveguide 1035 after propagating through the turns 1020 of the gyro coil 1010. In this example, the pitches p1, p2, p3 and p4 between the waveguide turns at the right, top, left and bottom side of the gyro coil 1010 are all the same. Therefore this gyro coil is a symmetric coil. The overlap region between the waveguide turns 1020 and the output waveguide 1035 (e.g. the region 1045 showed within the dashed circle) has enhanced loss due to waveguide crossing. The designs shown in FIGS. 11 and 13 addresses this problem by making changes in the design of the gyro coil.

Figure 11:
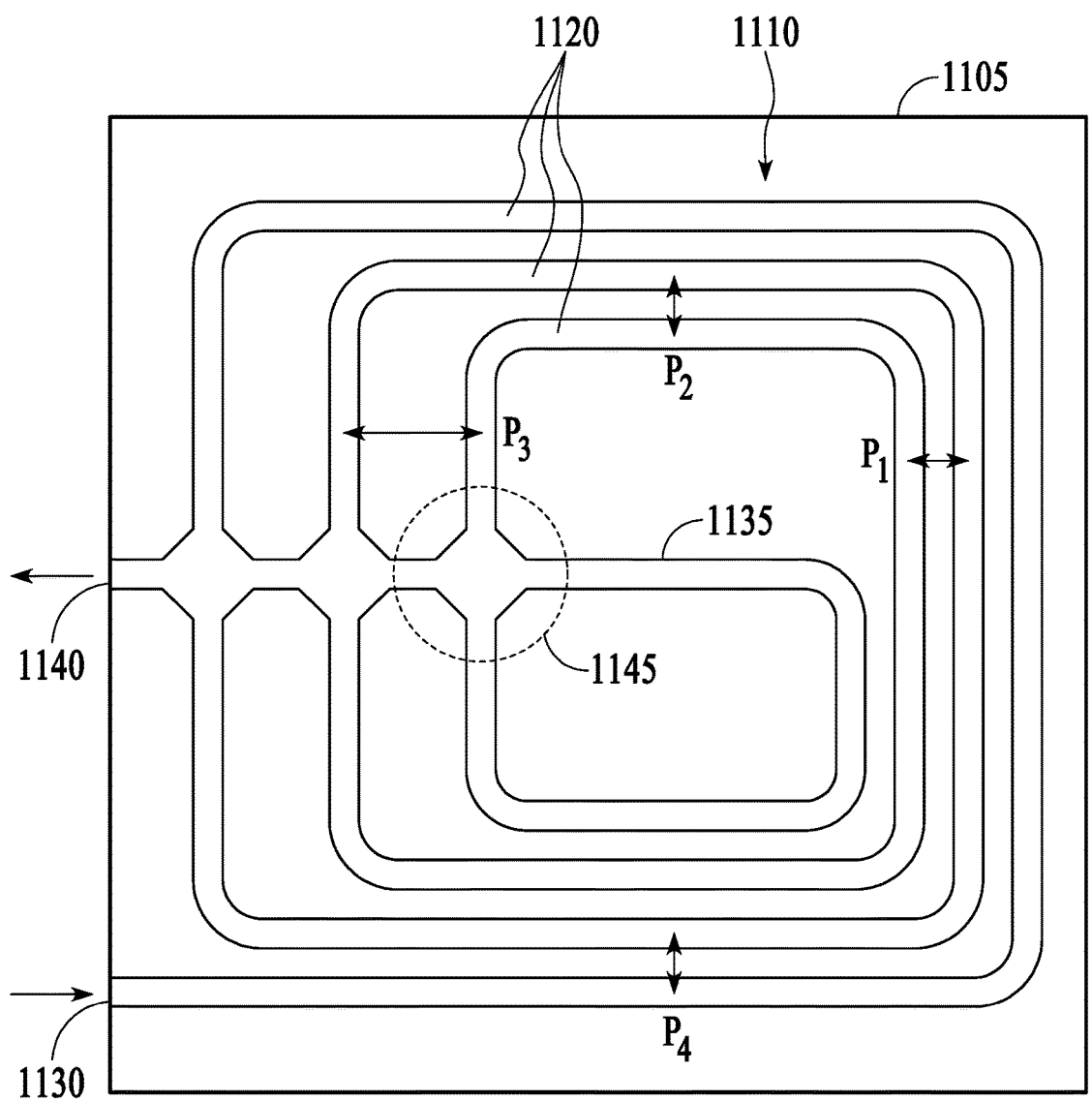
FIG. 11 shows the top view of a rectangular gyro coil in one layer with asymmetrical pitch between the waveguides on the side where the output waveguide crosses the waveguides of the coil, according to embodiments of the present disclosure.

In the top view of the embodiment shown in FIG. 11, an optical signal enters the input end 1130 of the waveguide gyro coil 1110 on a SiPhOG chip 1105. The optical signal comes out of the output end 1140 of the output waveguide 1135 after propagating through the turns 1120 of the gyro coil 1110. In this example, the pitches p1, p2, p3 and p4 between the waveguide turns at the right, top, left and bottom side of the gyro coil 1010 are not necessarily the same. In one example, pitches p1, p2 and p4 may be the same, but p3 is greater than p1 to accommodate adiabatic taper (e.g., 1205 shown in FIG. 12). Therefore this gyro coil is an asymmetric coil. The overlap region between the waveguide turns 1120 and the output waveguide 1135 (e.g. the region 1145 showed within the dashed circle, and shown in greater detail in FIG. 12) compensates for loss that otherwise would have been there due to waveguide crossing as in FIG. 10.

Figure 12:
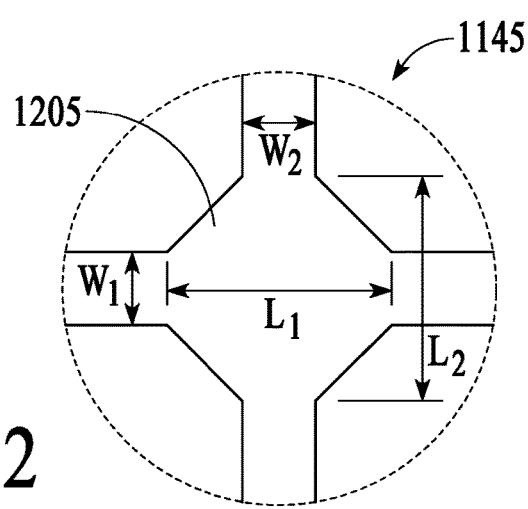
FIG. 12 shows a blow-up of the crossing region in the structure shown in FIG. 11, showing adiabatic tapers to lower loss, according to embodiments of the present disclosure.

FIG. 12 shows the adiabatic taper region 1205 at the waveguide crossing. Note that though the taper lengths L1 and L2 are shown to be equal, depending on the waveguide dimension w1, w2, and amount of loss to be compensated, lengths L1 and L2 may be varied. Length of the taper also affects the pitch p3. Larger p3 means more real-estate is utilized on the mask layout for the gyro coil. The space on the mask layout bounded by the innermost turns of the waveguide gyro coil 1110 may be utilized to have other test structures on the wafer.

Figure 13:
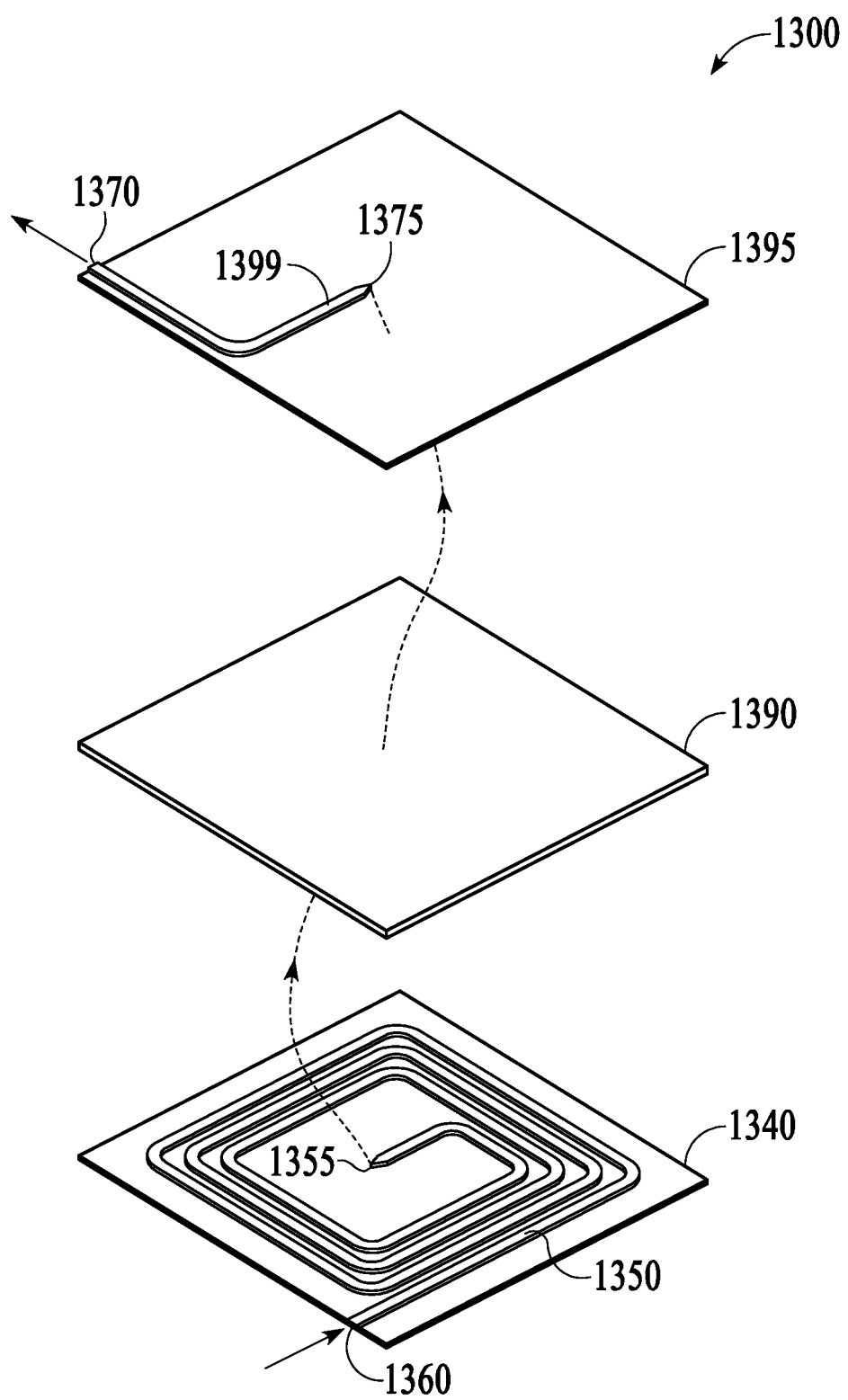
FIG. 13 is an exploded perspective view of a rectangular gyro coil where the output waveguide does not intersect with the waveguides of the coil, according to embodiments of the present disclosure. In this embodiment, the output waveguide comes out from a different plane as the input waveguide.

FIG. 13 is an exploded perspective view of a spiral waveguide based SiPhOG 1300 where the output waveguide does not intersect with the turns of the gyro coil, and hence avoids enhanced loss due to intersecting waveguides. This multi-layer design does not need to introduce adiabatic tapers (as shown in FIGS. 11-12) either. In the example embodiment shown in FIG. 13, the waveguide turns are on the bottom plane, and the output waveguide end 1370 comes out from the top plane in a direction different from the direction of the input waveguide, though the output waveguide end 1370 may then be reoriented in the direction of input end 1360 away from the coil footprint and the light may be coupled back to the bottom plane for efficient coupling. In a preferred embodiment, the output waveguide and the input waveguide are to be on the same plane, and portions of the gyro coil may be distributed between the upper and lower planes, as shown in FIG. 6 (the only difference would be the shape of the spiral is rectangular instead of circular shown in FIG. 6). The output waveguides could be in same side of the chip or on another side of chip as the input waveguide. In one embodiment, light couples up to the upper plane and then couples back down to the lower plane, if both the input and output waveguides are in the lower plane. In another embodiment, light coupled down to the lower plane and then couples back up to the upper plane, if both the input and output waveguides are in the upper plane. Note that though the example embodiments are described with two planes, there may be more than two planes, each having portions of the gyro coil, and light being coupled up and down (without changing directions) between the multiple planes.

In FIG. 13, a substrate layer and some of the other interposing layers are not shown for clarity. The layer 1340 with the gyro coil 1350 is preferably fused silica. The input end that receives an optical signal is denoted as 1360, wherein the output end is denoted as 1370. The gyro coil 1350 spirals inwards to the tapered tip 1355, where it couples up to the top layer 1395 that has output waveguide 1399. Thickness of a layer 1390 (typically an oxide layer in between the layers 1340 and 1395) sets the coupling gap. The output waveguide starts from the tapered tip 1375, and bends outwards to the output end 1370 to a detector or other optical system components. The arrowed dashed line show the coupling up between the tapered tips in the two planes. The taper design and the vertical separation between the two layers with waveguides dictate coupling efficiency between the two planes. In order for light to couple between the two vertical planes, the tapered tips 1355 and 1375 must have some overlap determined by the taper design.

In summary, the present disclosure describes various embodiments for single-layer and/or multi-layer designs of low-loss waveguide based gyroscope coils for a SiPhOG system. The propagation loss in the SiN waveguides described herein can be well below 0.1 db/meter. This is a vast improvement over the current state-of-the-art SiN process with propagation loss in the range of 0.1 db/centimeter. The key to lowering the loss while using the standard silicon fab processes and equipment is to use high quality fused silica (sometimes called "glass") wafers, and/or, using wafers with an oxide layer serving as part of the cladding around a core. A repeated deposition/anneal steps during oxide deposition ensure precise control of thickness of the oxide layer, as well as expunging trapped hydrogen from the deposited sub-layers.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense. Additionally, the directional terms, e.g., "top", "bottom" etc. do not restrict the scope of the disclosure to any fixed orientation, but encompasses various permutations and combinations of orientations.

What is claimed is:

1. A waveguide structure, comprising two fused silica wafers directly adjacent to a first core, the waveguide structure created by:
   providing a first fused silica wafer acting as a first cladding;
   forming a patterned silicon nitride (SiN) layer on top of the first fused silica wafer, wherein the patterned SiN layer acts as the first core;
   forming an oxide layer coinciding with the patterned SiN layer, wherein the oxide layer surrounds the first core from sides; and
   bonding a second fused silica wafer to the oxide layer and the patterned SiN layer, wherein the second fused silica wafer acts as a second cladding, and wherein the first core is surrounded by the first fused silica wafer underneath, and second fused silica wafer directly on top and the oxide layer on the sides.

2. The waveguide structure of claim 1, wherein the oxide layer is deposited after the SiN layer is formed.

3. The waveguide structure of claim 2, wherein an initial deposited thickness of the oxide layer is reduced by chemical mechanical polishing (CMP), such that so that a top surface of the oxide layer is substantially planar and flush with a top surface of the SiN layer acting as the first core.

4. The waveguide structure of claim 3, wherein a bonding between the first fused silica wafer and the oxide layer is done by activation of bonding surfaces by oxygen plasma followed by a thermomechanical process.

5. The waveguide structure of claim 3, wherein a bonding between the first fused silica wafer and the oxide layer silica wafer is done by anodic bonding.

6. The waveguide structure of claim 1, wherein the oxide layer is formed using a silane-based precursor, a chlorine-based precursor, or a deuterated source.

7. The waveguide structure of claim 1, wherein the oxide layer is formed by depositing multiple sub-layers of the oxide.

8. The waveguide structure of claim 7, wherein before depositing each sub-layer of the oxide, a respective annealing step is performed to drive out excess hydrogen.

9. The waveguide structure of claim 8, wherein annealing temperature is greater than 1100 degrees Celcius and annealing duration is greater than or equal to 2 hours.

10. The waveguide structure of claim 1, wherein the first fused silica wafer and the second fused silica wafer comprise non-crystalline high purity glass.

11. The waveguide structure of claim 10, wherein the non-crystalline high purity glass has low absorption in the infra-red (IR) wavelength region.

12. The waveguide structure of claim 1, wherein the waveguide structure has ultra-low loss for light beam propagating along the waveguide structure.

13. The waveguide structure of claim 12, wherein the waveguide structure is used as a rotation sensing element in an integrated photonics optical gyroscope.

14. The waveguide structure of claim 1, further comprising:
   a second patterned silicon nitride (SiN) layer formed on top of the second fused silica wafer, wherein the second patterned SiN layer acts as a second core;
   a second oxide layer deposited on the second patterned SiN layer, wherein the second oxide layer surrounds the second core at least from sides.

15. The waveguide structure of claim 14, further comprising:
   a third fused silica wafer bonded to the second oxide layer, wherein the third fused silica wafer acts as a third cladding, and wherein the second core is surrounded by the second fused silica wafer underneath, and the third fused silica wafer on the top and the second oxide layer on the sides.

16. The waveguide structure of claim 15, wherein the waveguide structure is used as a multi-layer rotation sensing element in an integrated photonics optical gyroscope.

* * * * *